UNITED STATES PATENT OFFICE.

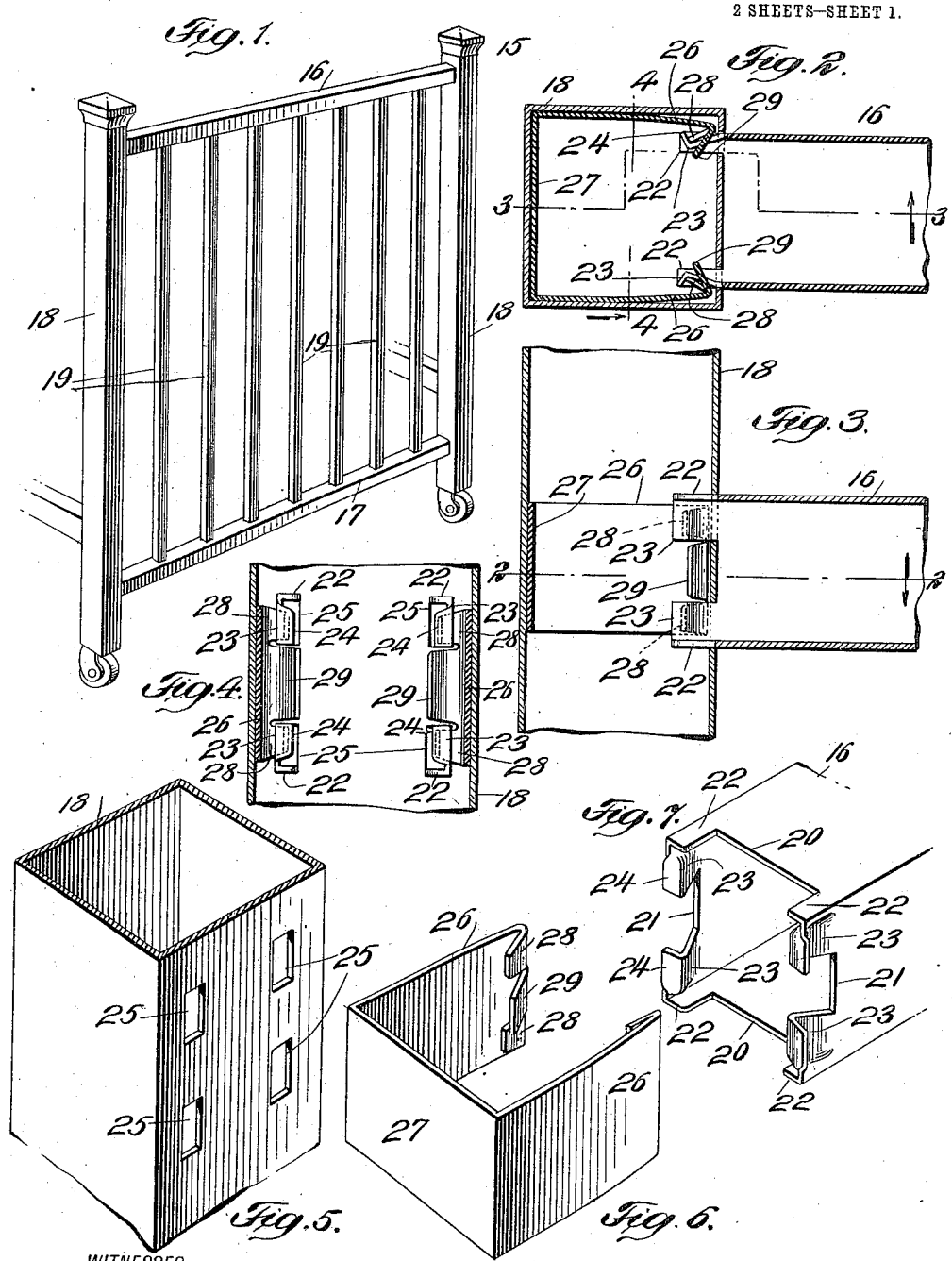

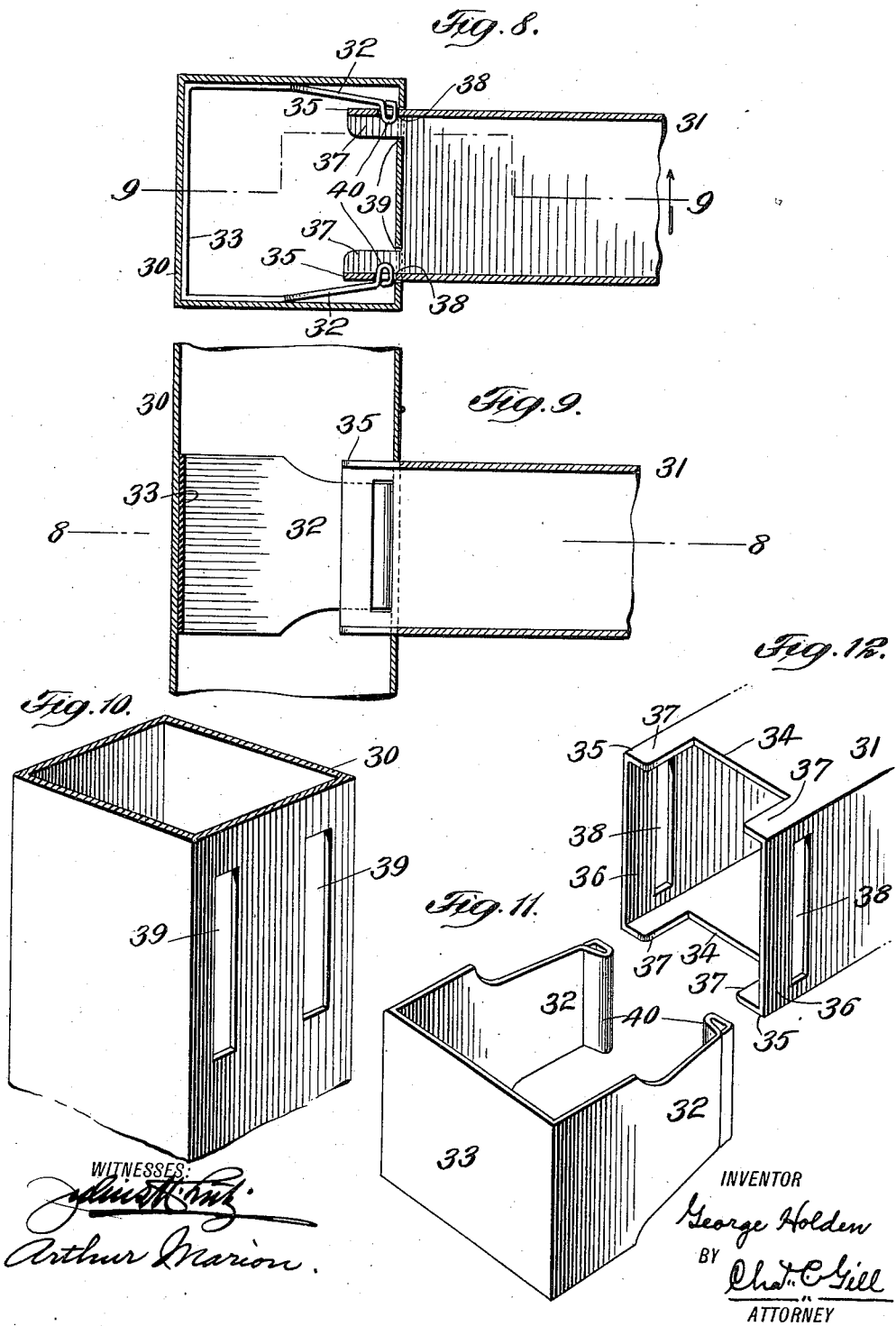

GEORGE HOLDEN, OF FLUSHING, NEW YORK, ASSIGNOR TO GREENPOINT METALLIC BED COMPANY, OF BROOKLYN, NEW YORK, A FIRM.

TUBULAR BEDSTEAD AND OTHER FRAME.

1,041,284.  Specification of Letters Patent.  Patented Oct. 15, 1912.

Application filed February 28, 1912. Serial No. 680,376.

*To all whom it may concern:*

Be it known that I, GEORGE HOLDEN, a citizen of the United States, and a resident of Flushing, in the county of Queens and State of New York, have invented certain new and useful Improvements in Tubular Bedstead and other Frames, of which the following is a specification.

The invention relates to improvements in frames composed of tubing, such as the head and foot frames of metal bedsteads, and it consists in the novel features and structure hereinafter described, and particularly pointed out in the claims.

The invention pertains more particularly to novel and efficient means for firmly connecting the ends of one tube to the sides of two other tubes, as, for illustration, the ends of the horizontal tubular rails of a head-frame or foot-frame of a metal bedstead with the sides of the tubular post members thereof.

The invention is applicable to many articles of furniture and the like constructed from sections of tubing, but I illustrate the same in this application in connection with the manufacture of metal bedsteads and for securing the upper and lower horizontal rails of the head or foot-frame of the bedstead to the tubular posts thereof.

In accordance with my invention I form on the ends of one tube or rail suitable projecting members and provide in the facing sides of two other tubes to be connected by said tube or rail suitable slots or openings to receive said projecting members, while within said other tubes I provide suitable springs to engage the said projecting members after they have entered said slots or openings and firmly bind the tubes together, said springs operating as clutches to engage the ends of one tube and secure the same against the facing sides of the other tubes.

The invention will be fully understood from the detailed description hereinafter presented, reference being had to the accompanying drawings, in which:

Figure 1 is a perspective view of a foot-frame or head-frame of a bedstead having its upper and lower horizontal rails connected with the tubular post-members by means embodying my invention; Fig. 2 is an enlarged horizontal section, on the dotted line 2—2 of Fig. 3, through the corner post and spring therein and a portion of one of the horizontal rails of the same, the rail being shown as having its end held against the post member by said inclosed spring; Fig. 3 is a vertical section through the same, taken on the dotted line 3—3 of Fig. 2; Fig. 4 is a vertical section through the same on the dotted line 4—4 of Fig. 2; Fig. 5 is a detached perspective view of a portion of the post and illustrates more particularly the slots or openings in one face thereof to receive the projections extending from the end of the horizontal rail; Fig. 6 is a detached perspective view of the spring employed within the post for interlocking with the projections extending from the end of the horizontal rail, as said projections enter through the slots or openings in said post shown in Fig. 5; Fig. 7 is a detached perspective view of an end portion of the rail and illustrates more particularly the projecting portions formed thereon to enter the slots or openings in the post and be engaged by the spring therein; Fig. 8 is a horizontal section through the post and a portion of the rail and corresponds with Fig. 2 but illustrates a modified form of the invention; Fig. 9 is a vertical section of the same on the dotted line 9—9 of Fig. 8; Fig. 10 is a perspective view of a portion of the post-member of the same and is presented to illustrate the slots or openings formed in one face thereof to receive the projections on the end of the rail; Fig. 11 is a detached perspective view of the spring-member utilized within the post in the construction presented in Figs. 8 to 12 to interlock with the end of the rail, and Fig. 12 is a detached perspective view of one end portion of the rail and illustrates more particularly the formation of the projections on the end thereof to enter the openings or slots shown in Fig. 10 and be engaged by the spring illustrated in Fig. 11 in the manner shown in Figs. 8 and 9, for locking the end of said rail against the side of the post.

In Figs. 1 to 7 inclusive I illustrate one embodiment of my invention, 15 designating an end frame, which may be either a foot-frame or a head-frame of a metal bedstead, comprising upper and lower tubular rails 16, 17, tubular posts 18 and a series of vertical parallel tubular rods 19 extending between and at their ends secured to said rails 16, 17.

My invention resides wholly in the means presented for securing the ends of the horizontal tubular rails 16, 17 to the facing sides of the posts 18, and I will first describe the construction shown in Figs. 1 to 7 inclusive.

The posts 18 and their parts correspond with each other and the rails 16, 17 correspond at each end and substantially with each other, and hence in Figs. 2 to 7 inclusive it may be considered that the left-hand post 18 and upper rails 16 of Fig. 1 are shown.

The tubular rail 16, here shown as rectangular in cross-section, is correspondingly recessed in its upper and lower end edges, as at 20, and also in its opposite vertical end edges, as at 21, said recesses leaving right-angular projections at the corners of the rail and each of said projections comprising a horizontal member 22 and a vertical member 23. The body portions of the members 23 are bent inwardly toward each other and their outer edges are flanged outwardly, as at 24, from each other, whereby said members become provided in their outer faces with recesses to receive and interlock with certain springs to be hereinafter described. The lower rail 17 corresponds exactly with the upper rail 16 except that it is usually somewhat less in vertical diameter than said upper rail.

Each post 18 is formed in its inner side wall in line with the rails 16, 17, with openings or vertical slots 25 adapted to snugly receive the projections on the ends of the rails, said projections in the assembling of the parts being passed through said openings or slots so as to be fully within the posts. When the rails are applied to the posts the inner edges of the recesses 20, 21 evenly engage the outer face of the post.

Within each post 18 and in line with the openings or slots 25 therein, I provide springs 26 to interlock with the projections on the ends of the rails when the latter are applied to the posts and thereby attach the ends of the rails to the posts. I preferably form the springs 26 from one integral strip of metal 27 bent into a three-sided outline snugly fitting within the interior of the post and engaging three sides thereof, as shown in Fig. 2. The outer or free ends of the spring-members 26 are deflected toward each other and each is formed at its free end, by slitting and return-bending the metal thereat, with upper and lower corresponding locking members or fingers 28 of hook form and an intermediate finger 29, which preferably will not be bent inwardly to the same extent as the fingers 28.

The three main features of my invention are shown in Figs. 5, 6 and 7, and in assembling these features the strip 27 carrying the springs 26 is inserted within the post from the end thereof and pushed to position with relation to the openings or slots 25 (Fig. 4) or until the upper and lower locking fingers 28 are in line with said slots and the fingers 29 are between them, and thereupon the rail is applied to the post, the projections on the end thereof being entered through the said openings or slots 25 and pushed inwardly until the edges of the recesses 20, 21 firmly engage the face of the post. When the projections on the rail are pressed through the openings or slots in the post, their vertical members 23, at the outer vertical edges of the flanges or lips 24, move against the inclined faces of the fingers 28 of the springs 26 and force said springs outwardly from each other to a sufficient extent to allow said projections to pass into the post, and then as the said projections reach their final position within the post the said flanges 24 pass just beyond the said fingers 28 and allow the springs 26 to spring toward each other and carry said fingers behind said flanges 24 and into the recessed outer sides of the members 23 of said projections, with the result that said springs and projections become interlocked and firmly secure the end of the rail against the face of the post. When the rail has been secured to the post by the aforesaid springs and projections, it cannot be pulled from the post and it cannot move upwardly or downwardly since the projections snugly fit the openings or slots 25. It is desirable that the springs 26 be prevented during any handling or use of the bed from shifting from their correct position, and this result is attained in my construction by the tight fit of the strip of metal 27 within the post and from the fact that the fingers 29 on the springs stand between the upper and lower projections on the rail and that the recesses in the outer faces of the vertical members 23 of said projections are, above the upper fingers 28 and below the lower fingers 28, closed and therefore confine said fingers in a way to prevent their having any vertical shifting movement. Of course the springs 26 may be secured in position in other ways, as by riveting them to the post, but my purpose has been to avoid such riveting and at the same time to present a very durable and efficient structure.

In the modification of my invention shown in Figs. 8 to 12 inclusive, the post is numbered 30, the rail 31 and the springs 32, said springs preferably being formed from an integral strip 33 bent into a three-sided outline to fit within the post, as shown in Fig. 8. The rail 31 is recessed in its upper and lower end edges, as at 34, leaving vertical channel-shaped projections 35, one being at each side of the end of the rail and composed of an extending portion 36 of the side of the rail and upper and lower horizontal flanges 37 created out of the metal of the top and bottom of the rail. The projections 35 are formed in their sides with vertical slots 38. The post 30 is formed in its face with two parallel vertical slots 39 to snugly receive the projections 35 on the end of the rail. The springs 32 are deflected toward each other at their outer or free ends, and thereat said springs are formed with inwardly extending locking flanges 40 adapted to enter and snugly fill the slots 38 in the rail when the rail is applied to the post. In assembling the parts the springs are inserted within the post and then the rail is applied to the post, the projections 35 of the rail being inserted through the slots 39 of the post and while moving inwardly causing the springs to flex outwardly until the slots 38 reach the flanges 40 of the springs, whereupon said flanges will be projected into said slots and firmly connect the rail with the post.

Both forms of my invention hereinbefore described enable a very efficient and rapid assembling of the rails and posts of a metal bedstead or like article and improve and lessen the manufacturing cost of the beds and the like.

I have presented two embodiments of my invention in order that it may be understood that the invention is not confined to specific details of form and construction and is capable of modification.

What I claim as my invention and desire to secure by Letters-Patent, is:

1. A frame comprising a tubular rail and a tubular end-member to whose side the end of said rail is secured, said rail being recessed at opposite sides of its end and having at the ends of said recesses forwardly extending projections, and said end-member having openings in its side snugly receiving said projection and within its interior oppositely disposed springs normally in the path through said openings and being at their free ends interlocked with said projections of the rail.

2. A frame comprising a tubular rail and a tubular end-member to whose side the end of said rail is secured, said rail being recessed at opposite sides of its end and having at the ends of said recesses forwardly extending projections, and said end-member having openings in its side snugly receiving said projections and within its interior oppositely disposed springs normally in the path through said openings and being at their free ends interlocked with said projections of the rail, said springs being the end portions of an integral metal strip bent to snugly engage the inner surface of said end-member.

3. A frame comprising a tubular rail and tubular end-members to whose facing sides the ends of said rail are secured, said rail being recessed at opposite sides of each end and having at the ends of said recesses forwardly extending projections, and said end-members having openings in their facing sides snugly receiving said projections and within their interiors oppositely disposed springs normally in the path through said openings and being at their free ends interlocked with said end projections of the rail, said springs being the end portions of integral metal strips bent to snugly engage the inner surfaces of said end members, and said projections on the ends of the rail being at their sides adapted to interlock with the free ends of said springs and hold the same against shifting endwise of said end-members.

4. A frame comprising a tubular rail and a tubular end-member to whose side the end of said rail is secured, said rail being recessed at opposite sides of its end and having at the ends of said recesses forwardly extending projections, and said end-member having openings in its side snugly receiving said projections and within its interior oppositely disposed springs normally in the path through said openings and having at their free ends inwardly bent portions forming engaging members interlocked with said projections of the rail, said projections having at their outer sides means to receive and interlock with said bent portions of said springs.

5. A frame comprising a tubular rail and a tubular end-member to whose side the end of said rail is secured, said rail being recessed at opposite sides of its end and having at the ends of said recesses forwardly extending projections, and said end-member having openings in its side snugly receiving said projections and within its interior oppositely disposed springs normally in the path through said openings and having at their free ends inwardly bent portions forming engaging members interlocked with said projections of the rail, said projections being recessed at their outer sides between their opposite edges to receive said bent portions of the said springs and also prevent the shifting of the springs endwise of the member containing them.

6. A frame comprising a tubular rail and a tubular end-member to whose side the end of said rail is secured, said rail being recessed at the four sides of its end and having between the adjoining ends of said recesses forwardly extending projections, and said end-member having openings in its side snugly receiving said projections and within its interior oppositely disposed springs normally in the path through said openings and having at their free ends inwardly bent portions forming engaging members interlocked with said projections of the rail, said projections having at their outer sides means to receive and interlock with said bent portions of said springs.

7. A frame comprising a tubular rail and a tubular end-member to whose side the end of said rail is secured, said rail being recessed at the four sides of its end and having between the adjoining ends of said recesses forwardly extending projections, and said end-member having openings in its side snugly receiving said projections and within its interior oppositely disposed springs normally in the path through said openings and having at their free ends outer fingers interlocked with said projections and intermediate fingers extended between said projections.

8. A frame comprising a tubular rail and a tubular end-member to whose side the end of said rail is secured, said rail being recessed at the four sides of its end and having between the adjoining ends of said recesses forwardly extending projections, and said end-member having openings in its side snugly receiving said projections and within its interior oppositely disposed springs normally in the path through said openings and having at their free ends outer fingers interlocked with said projections and intermediate fingers extended between said projections, said projections being recessed inwardly at their outer sides and flanged outwardly at their outer edges.

Signed at Brooklyn, in the county of Kings and State of New York, this 26th day of February, A. D. 1912.

GEORGE HOLDEN.

Witnesses:
　Louis B. Funk,
　George Newman.